United States Patent Office 3,492,292
Patented Jan. 27, 1970

3,492,292

20-SPIROX-4,6-DIEN-3-ONE ALDOSTERONE INHIBITORS

George Gal, Summit, and Meyer Sletzinger, North Plainfield, N.J., assignors to Merck & Co., Inc., Rahway, N.J., a corporation of New Jersey No Drawing. Filed Apr. 21, 1966, Ser. No. 544,091
Int. Cl. C07c *173/00, 169/20;* A61k *27/00*
U.S. Cl. 260—239.55 2 Claims

ABSTRACT OF THE DISCLOSURE

The invention disclosed herein is generally concerned with the preparation of steroids which are intermediates for the preparation of 20-spirox-4,6-dien-3-one and 20-spirox-7α-acetylthio-4,6-dien-3-one which possess useful therapeutic properties as aldosterone inhibitors. The intermediates is accomplished by reacting 3β-hydroxy-20-spirox-5-ene with bromine to form the 5,6-dibromo derivative, reacting the latter with chromic acid to oxidize the 3-substituent to keto, and reacting the resulting 5,6-dibromo-20-spiroxan-3-one with lithium carbonate.

Aldosterone inhibitors block the salt-retaining effects of aldosterone and other salt-retaining steroids and thereby have utility in the treatment of diseases such as congestive heart failure, nephrosis, and cirrhosis of the kidney in which aldosterone secretion is increased. More particularly, this invention relates to the intermediate steroid compounds 3β-hydroxy-5,6-dibromo-20-spiroxane, 5,6-dibromo-20-spiroxan-3-one and methods for the preparation thereof, and a method for the preparation of 20-spirox-4,6-dien-3-one.

The starting material for the preparation of the novel intermediate steroid compounds of this invention and for the preparation of 20-spirox-4,6-dien-3-one is 3β-hydroxy-20-spirox-5-ene. The starting compound may be conveniently prepared by a process which comprises a first step of reacting dehydroepiandrosterone tetrahydropyranyl ether with 3-lithiopropanyl-1,2′-tetrahydropyranyl ether to provide 17α-(3′-hydroxypropyl)-5-androstene-3β,17β-diol di-tetrahydropyranyl ether. This reaction is accomplished by adding an ether solution of 3-lithiopropanyl-1,2′-tetrahyropyranyl ether to a solution of dehydroepiandrosterone tetrahydropyranyl ether as an anhydrous organic solvent, preferably tetahydofuan, the temperature of the reaction mixture being kept below about 30° C. during the addition. After addition is complete, the reaction mixture is allowed to stand at room temperature for about 15 hours. The reaction mixture is then added to water, and the reaction product is removed by extraction with a suitable organic solvent, such as ether. The ether extract is washed with water, dried and the solvent is removed by distillation under reduced pressure. The residue is 17α-(3′-hydroxypropyl)-5-androstene-3β,17β-diol di-tetrahydropyranyl ether. The latter compound may be converted in a second step to 17α-(3′-hydroxypropyl)-5-androstene-3β,17β-diol without purification by allowing a solution thereof in a suitable solvent, such as ethanol, containing a catalytic amount of strong acid, preferably p-toluenesulfonic acid to stand at room temperature for several hours. 17α-(3′-hydroxypropyl)-5-androstene-3β,17β-diol precipitates from the reaction mixture on standing and is filtered off, washed with a suitable solvent, such as ethanol, and dried under reduced pressure. In a third step, 17α-(3′-hydroxypropyl)-5-androstene-3β,17β-diol is treated in pyridine solution with an acid chloride of an aromatic or aliphatic sulfonic acid, such as p-toluenesulfonyl chloride or methanesulfonyl chloride, to provide a 3β-aromatic sulfonyloxy-20-spirox-5-ene or a 3β-aliphatic sulfonyloxy-20-spirox-5-ene, such as 3β-p-toluenesulfonyloxy-20-spirox-5-ene or 3β-mesyloxy-20-spirox-5-ene. The latter compound is converted in a fourth step to 3β-hydroxy-20-spirox-5-ene. The third step reaction may be conveniently accomplished by adding the aromatic or aliphatic sulfonyl chloride dropwise to a slurry of 17α-(3′-hydroxypropyl)-5-androstene-3β,17β-diol in anhydrous pyridine. During the addition the reaction mixture is maintained at a temperature of about −10° C., and the acid chloride is added over a period of from about 20 to 30 minutes. After addition is complete, the mixture is stirred for about 3 hours at a temperature in the range from about −10° C. to 0° C. and then allowed to stand ovenight at room temperature. The reaction product is isolated by pouring the reaction mixture into ice water and removing the precipitated product by extraction with a suitable solvent, such as ethyl acetate. The extract is washed with cold dilute hydrochloric acid until it is free from pyridine, and the solvent is removed from the resulting solution by distillation under reduced pressure. The residue is crude 3β-aromatic sulfonyloxy-20-spirox-5-ene or 3β-aliphatic sulfonyloxy-20-spirox-5-ene and may be used without purification in the fourth step to produce 3β-hydroxy-20-spirox-5-ene. This is conveniently accomplished by dissolving the crude material in aqueous acetone, preferably in a 4.5–1 acetone-water solvent mixture and heating the resulting solution under reflux for several hours. The reaction product may be isolated by removing the acetone by distillation under reduced pressure and simultaneously adding water to maintain a constant volume. 3β-hydroxy-20-spirox-5-ene precipitates as acetone is removed. After all of the acetone is removed, the resulting slurry is cooled to about 10° C. and the solid material is removed by filtration and dried under reduced pressure. The crude 3β-hydroxy-20-spirox-5-ene may be purified by suspending in a suitable organic solvent, such as normal-hexane, and stirring the resulting slurry at a temperature of about 60° C. for several hours, cooling the mixture to room temperature, filtering, washing the solid material with a suitable solvent, such as normal-hexane, and drying the solid material under reduced pressure.

In the process of this invention, the purified 3β-hydroxy-20-spirox-5-ene is used as an intermediate in the preparation of 20-spirox-4,6-dien-3-one by a process which comprises a first step of bromination to provide 3β-hydroxy-5,6 - dibromo - 20 - spiroxane. Bromination is conveniently accomplished by adding a solution of bromine in an inert organic solvent, such as methylene chloride, to a solution of 3β-hydroxy-20-spirox-5-ene in an inert organic solvent, preferably the same solvent, the solution being cooled and kept under nitrogen during the addition. After addition is complete, the solution is allowed to stand for about 15 minutes at about 5° C. and then concentrated by removing the solvent under reduced pressure. The residual syrup is dissolved in an organic solvent, such as acetone, and upon cooling the solution and allowing it to stand, crystalling 3β-hydroxy-5,6-dibromo-20-spiroxane precipitates. The precipitate is removed by filtration, washed with cold water, and dried under reduced pressure.

The second step of the process for the preparation of 20-spirox-4,6-dien-3-one is the oxidation of 3β-hydroxy-5,6-dibromo-20-spiroxane to provide 5,6 - dibromo - 20-spiroxan-3-one. Oxidation is conveniently accomplished by adding 8 N chromic acid solution in 40% sulfuric acid dropwise over a period of about 3 to 4 minutes to a solution of 3β-hydroxy-5,6-dibromo-20-spiroxane in an inert organic solvent, such as acetone, which is kept under nitrogen and maintained at a temperature of about −5° C. during the addition. After addition is complete, the reaction mixture is stirred for about 30 minutes and then poured into ice cold water. The solid which precipitates is removed by filtration and dissolved in a suitable solvent, such as methylenechloride. The resulting solution is washed with cold saturated aqueous sodium chloride solution, dried over anhydrous magnesium sulfate, and the solvent is removed by distillation under reduced pressure. The residue is 5,6-dibromo-20-spiroxan-3-one. This substance is relatively unstable, and it is preferred that it be used promptly in the next reaction step.

The final reaction step in the preparation of 20-spirox-4,6-dien-3-one is dehydrobromination of the 5,6-dibromo-20-spiroxan-3-one. Dehydrobromination is conveniently accomplished by reaction with lithium carbonate and lithium bromide in dimethylformamide solution. The three reagents are added to a solution in an inert organic solvent, such as methylene chloride, of 5,6-dibromo-20-spiroxan-3-one. The solvent is removed by distillation under reduced pressure, and the resulting mixture is heated under nitrogen for about 20 hours at a temperature of from about 95° to 100° C. The reaction mixture is then cooled to room temperature, poured into ice cold water, and extracted with ether. The ether extract is dried over magnesium sulfate, and the ether is removed by distillation under reduced pressure. The residue is 20-spirox-4,6-dien-3-one. 20-spirox-4,6-dien-3-one may be readily converted to 20-spirox-7α-acetylthio-4,6-dien-3-one by reaction with thioacetic acid according to known procedures.

PREPARATION 1

17α-(3'-hydroxypropyl)-5-androstene-3β,17β-diol 8.9 grams of 3-chloropropanol-1,2'-tetrahydropyranyl ether is added over a period of 2 hours to a slurry comprising 0.8 gram of finely divided lithium in 40 ml. of anhydrous ether. The temperature of the reaction mixture is kept under an argon atmosphere and maintained at −5° to −10° C. during the addition. The reaction mixture is filtered in an argon atmosphere to remove traces of unreacted lithium and lithium chloride. The clear filtrate is an ether solution of 3-lithiopropanol-1,2'-tetrahydropyranyl ether and is added to a solution of 10.5 grams of dehydroepiandrosterone tetrahydropyranyl ether in solution in 110 ml. of anhydrous tetrahydrofuran over a period of 30 minutes, during which time the temperature of the reaction mixture is kept below 30° C. The reaction mixture is allowed to stand for 15 hours at room temperature after addition is complete and is then cautiously added to 500 ml. of cold water. This mixture is extracted three times with ether and the combined ether extracts are washed with water and dried over anhydrous magnesium sulfate. The solvent is removed from the dried extracts by distillation under reduced pressure. The oily residue is 17α-(3'-hydroxypropyl)-5-androstene-3β,17β-diol di-tetrahydropyranyl ether.

PREPARATION 2

The oily residue from Preparation 1 is dissolved in 100 ml. of ethanol and 0.7 gram of p-toluenesulfonic acid in solution in 10 ml. of ethanol are added to the solution of the oily residue and the resulting solution is stirred at room temperature for 5 hours. The precipitate which forms is removed by filtration, washed with ethanol, and dried under reduced pressure. 5.66 grams of 17α-(3'-hydroxypropyl)-5-androstene-3β,17β-diol are obtained, which has a melting point of 274° to 278° C.

PREPARATION 3

3β-mesyloxy-20-spirox-5-ene 10.2 grams of mesylchloride are added dropwise over a period of 20 to 30 minutes to a slurry of 7.5 grams of 17α-(3'-hydroxypropyl)-5-androstene-3β,17β-diol in 75 ml. of anhydrous pyridine. The reaction mixture is kept at a temperature of −10° C. during the addition. After addition is complete, the mixture is stirred for 3 hours and during this period the temperature is kept between −10° C. and 0° C. The mixture is then allowed to come to room temperature and stand at room temperature overnight. After standing overnight, the reaction mixture is poured into 700 ml. of ice water, and the precipitate is removed by extraction with ethyl acetate. The extract is washed with 0.5 N hydrochloric acid until free from pyridine, dried over anhydrous magnesium sulfate, and filtered. The solvent is removed by distillation under reduced pressure. A residue of 8.9 grams of crude 3β-mesyloxy-20-spirox-5-ene is obtained, which has a melting point of 132° to 134° C.

PREPARATION 4

3β-hydroxy-20-spirox-5-ene

The crude 3β-mesyloxy-20-spirox-5-ene is dissolved in a solvent mixture composed of 180 ml. of acetone and 40 ml. of water. The resulting solution is refluxed for 4 hours and the acetone is then removed by distillation under reduced pressure and replaced simultaneously with water at a rate such that the volume in the distillation flask is maintained at a constant level. The resulting slurry is cooled to 10° C., and the solid material is removed by filtration, washed with water until acid free, and dried under reduced pressure. 7.1 grams of 3β-hydroxy-20-spirox-5-ene are obtained, which has a melting point of 165° to 172° C. The crude 3β-hydroxy-20-spirox-5-ene is suspended in 70 ml. of normal-hexane, and the suspension is stirred for 2 hours at a temperature of 60° C. The suspension is cooled to room temperature, filtered, and the solid material is washed with normal-hexane and dried under reduced pressure. 6.7 grams of 3β-hydroxy-20-spirox-5-ene are obtained, which has a melting point of 185° to 187° C.

The following examples illustrate methods of carrying out the present invention, but it is to be understood that these examples are given for purposes of illustration and not of limitation.

EXAMPLE 1

3β-hydroxy-5,6-dibromo-20-spiroxane 9.9 grams of 3β-hydroxy-20-spirox-5-ene are dissolved in 220 ml. of methylenechloride. The solution is cooled to 5° C. under nitrogen and a solution of 4.8 grams of bromine and 25 ml. of methylenechloride is added over a period of 10 minutes. After addition is complete, the solution is allowed to stand at a temperature of 5° C. for 15 minutes and the solvents are then removed by distillation under reduced pressure. The residue is dissolved in 30 ml. of dry acetone and the acetone solution is cooled to 0° C. and allowed to stand at that temperature for 20 minutes. 3β-hydroxy-5,6-dibromo-20-spiroxane crystallizes from the acetone solution on standing and is removed by filtration, washed with cold acetone, and dried under reduced pressure. 12.5 grams of 3β-hydroxy-5,6-dibromo-20-spiroxane, having a melting point of 124° to 125° C., are obtained.

EXAMPLE 2

5,6-dibromo-20-spiroxan-3-one 4.9 grams of 3β-hydroxy-5,6-dibromo-20-spiroxane are dissolved in 350 ml. of acetone and the acetone solution cooled to −5° C. under nitrogen. 3.3 ml. of 8 N chromic acid in 40% sulfuric acid are added dropwise to the acetone solution over a period of 4 minutes. After addition is complete, the reaction mixture is stirred for 30 minutes and poured into 400 ml. of ice water. The solid which precipitates when the acetone solution is poured into ice water is removed by filtration, and the wet solid is dissolved in 70 ml. of methylenechloride. The methylenechloride solution is washed with cold saturated aqueous sodium chloride solution, dried over anhydrous magnesium sulfate, and filtered. The solution is concentrated to a volume of 40 ml. by distilling off the solvent under reduced pressure. The residual solution contains 5,6-dibromo-20-spiroxan-3-one in solution.

EXAMPLE 3

20-spirox-4,6-dien-3-one 3.1 grams of lithium carbonate, 2.7 grams of lithium bromide and 30 ml. of dimethylformamide are added to the methylenechloride solution of 5,6-dibromo-20-spiroxan-3-one obtained as above. The methylenechloride is removed from the reaction mixture by distillation under reduced pressure and the residual solution is heated under nitrogen for 20 hours at a temperature of 95° to 100° C. After the heating period, the reaction mixture is cooled to room temperature and poured into 300 ml. of ice cold water. The resulting suspension is extracted with ether, the ether solution is dried over anhydrous magnesium sulfate, filtered, and the ether is removed by distillation under reduced pressure. The residue is 3.01 grams of 20-spirox-4,6-dien-3-one, which has a melting point of 103° to 105° C.

Various changes and modifications may be made in carrying out the present invention without departing from the spirit and scope thereof. Insofar as these changes and modifications are within the purview of the annexed claims, they are to be considered as part of our invention.

What is claimed is:
1. 3β-hydroxy-5,6-dibromo-20-spiroxane.
2. 5,6-dibromo-20-spiroxan-3-one.

References Cited

UNITED STATES PATENTS

| | | | |
|---|---|---|---|
| 3,146,244 | 8/1964 | Mancera et al. | 260—397.3 |
| 3,270,008 | 8/1966 | Dryden et al. | 260—239.55 |

OTHER REFERENCES

Djerassi: Steroid Reactions (1963) p. 217.

HENRY A. FRENCH, Primary Examiner

U.S. Cl. X.R.

260—397.5, 999